April 9, 1968     J. K. SHANNON ETAL     3,377,609
REPLACEMENT CONNECTOR
Filed Sept. 7, 1965
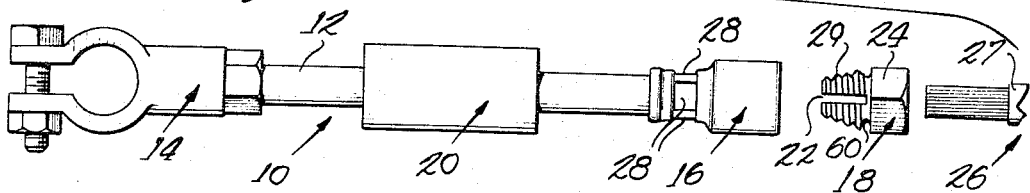
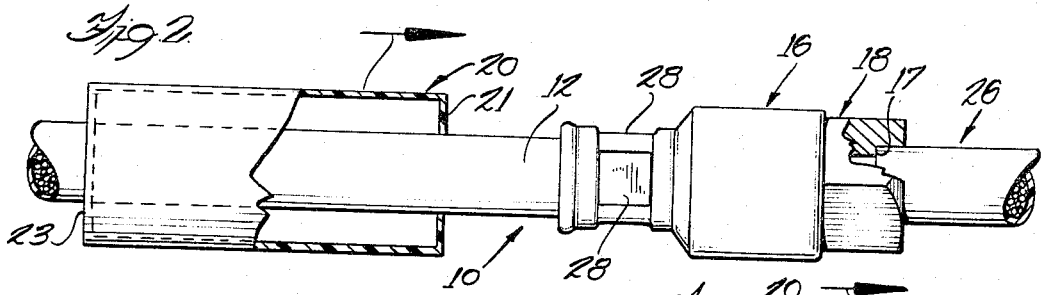
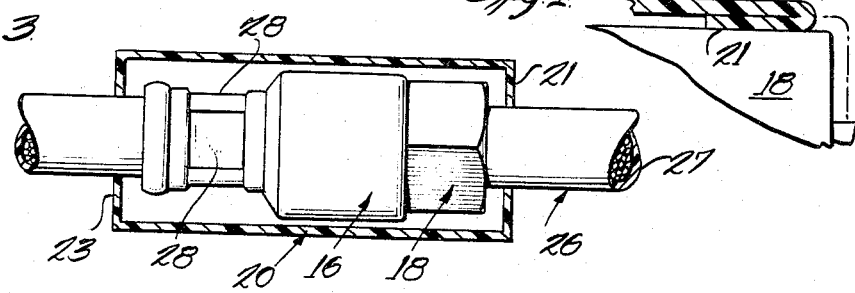
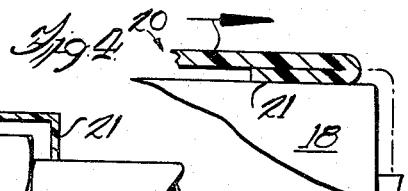
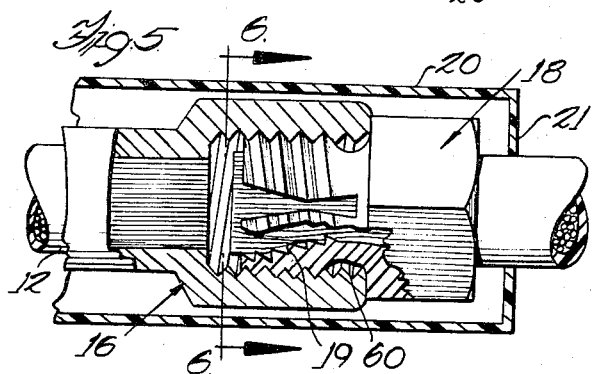
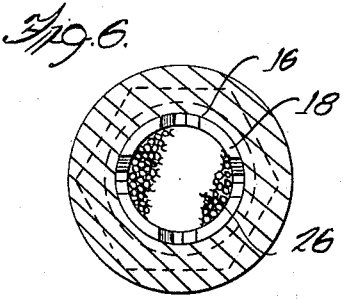
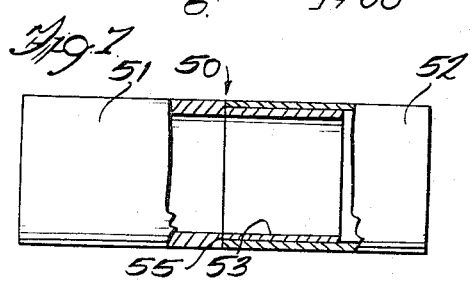
Inventors
John K. Shannon
Owen G. Duncan
Dominik & Stein
Attorneys

United States Patent Office 3,377,609
Patented Apr. 9, 1968

3,377,609
REPLACEMENT CONNECTOR
John K. Shannon, 6504 43rd Ave., Kenosha,
Wis. 53140, and Owen G. Duncan, 3621
North Bay Drive, Racine, Wis. 53402
Filed Sept. 7, 1965, Ser. No. 485,519
1 Claim. (Cl. 339—28)

ABSTRACT OF THE DISCLOSURE

A connector which generally comprises a wire cable with a terminal clamp, ground lug or the like affixed to its one end and a threaded splice adapter affixed to its opposite end. An insulation sleeve is adapted to be slid over the splice adapter after it has been affixed to the end of a cable to completely cover and insulate the splice adapter. As explained fully hereinafter, the replacement connector can be affixed to the end of a cable with the use of ordinary tools, such as a wrench or a pliers.

---

This invention relates to a connector, and more particularly to a replacement connector for wire cable, rods, tubes and the like, which are damaged, broken or corroded, or which may have connectors fixedly secured thereto that must be replaced, for one reason or another. The connector can also be used for initial installations, if desired.

The connector is especially adapted for use with a battery cable having a terminal clamp, or a ground lug, attached thereto, or a threaded adapter for fastening the cable to an automobile frame, by threading it directly into a tapped hole in the frame. In the past, terminal clamps, ground lugs and the like have been either cast directly onto the end of the cable, or soldered or crimped with pressure, or secured by a second integral clamp having a plate and bolts which are tightened onto the end of the cable. The battery cables and the associated adapters, as it is well known, are particularly subject to corrosion which, if proper cautions are not taken, requires a new battery cable and/or adapter to be provided. Also, the battery cable and adapters are frequently removed, for one reason or another, and if care is not taken the insulation on the cable or the wires of the cable are damaged, necessitating the replacement of the cable. Generally, a completely new battery cable and its associated adapter is provided, or else the battery cable is cut back and a new adapter attached to it. The latter method of repairing the battery cable, in most cases, cannot be employed successfully because the battery cable initially installed is only of sufficient length to be attached to the battery terminal post or the like and when cut back so that a new adapter can be attached to it, it is thereafter too short to reach the battery terminal post.

Replacement connectors comprising a short length of cable with a terminal clamp or ground lug on one end and an adapter for splicing the short length of cable to the available battery cable so that the battery cable will still reach the battery terminal post after it is cut back are available, however, they are generally unsatisfactory, for one reason or another. For example, they generally appear to be make shift or are overly bulky or complicated in structure and, in most cases, require special tools to affix them to the end of the cable.

Accordingly, it is an object of this invention to provide an improved replacement connector which is easily affixed to the end of a wire cable, rod, tube or the like.

It is another object to provide a replacement connector of the above character which can be easily affixed to a cable or the like, using ordinary tools customarily found in garages, service stations and mechanic's tool kits and without the need for elaborate machinery, jigs, presses or torches.

It is still another object to provide a connector which, after being affixed to the cable or the like, presents a neat finished appearance and completely covers the strands of the cable so as to protect them against corrosion and contamination. In this respect, means are provided to completely cover the splice adapter so as to protect it against corrosion and contamination and to further insulate the same so that the splice adapter does not present an electrical hazard.

It is a still further object to provide a connector which permits the retailer to cut back the cable or the like to remove the damaged portion and to apply a replacement connector having an appropriately designed terminal clamp, ground fitting or the like.

It is a still further object to provide a replacement connector which has a finished appearance after installation.

It is a still further object to provide a replacement connector which binds tightly around the cable so that a good connection which requires very little, if any, subsequent maintenance is provided.

Other objects of the invention will in part be obvious and will in part appear hereinafter.

The above outlined objectives are accomplished with a connector which generally comprises a wire cable with a terminal clamp, ground lug or the like affixed to its one end and a threaded splice adapter affixed to its opposite end. An insulation sleeve is adapted to be slid over the splice adapter after it has been affixed to the end of a cable to completely cover and insulate the splice adapter. As explained fully hereinafter, the replacement connector can be affixed to the end of a cable with the use of ordinary tools, such as a wrench or a pliers.

The invention accordingly comprises the features of construction, combination of elements, and arrangements of parts which will be exemplified in the construction hereinafter set forth, and the scope of the invention will be indicated in the claims.

For a fuller understanding of the nature and objects of the invention, reference should be had to the following detailed description taken in connection with the accompanying drawings, in which:

FIGURE 1 is a partly exploded view of a connector exemplary of the present invention, illustrating the connector and the cable, in unassembled form;

FIGURE 2 is an enlarged view of the splice adapter end of the connector, illustrating its connection upon a cable, with the insulation sleeve, which is shown partially sectioned, positioned on the cable, before it is slid in position over the splice;

FIGURE 3 illustrates the insulation sleeve, in section, and in position over the splice;

FIGURE 4 is an enlarged, partly sectioned view illustrating how one end wall of the sleeve folds back during installation over the splice adapter;

FIGURE 5 is an enlarged, partly sectioned view of the finished splice;

FIGURE 6 is a sectional view taken along lines 6—6 of FIG. 5; and

FIGURE 7 is a plan view, partially sectioned, of another embodiment of an insulation sleeve.

Similar reference characters refer to similar parts throughout the several views of the drawing.

Broadly, the replacement connector 10 exemplary of this invention, as best seen in FIG. 1, comprises a short length of wire cable 12, usually cut at the site, in accordance with the need presented, and upon which has been affixed to its one end, a battery terminal clamp 14 and, to its other end, a splice adapter 16 which is threaded to receive a compression sleeve 18. Insulation sleeve 20 has been slipped over the wire cable 12 prior to application of the splice adapter 16. It is capable of sliding over and completely covering the splice to insulate it.

The battery terminal clamp 14 may be affixed to the end of the wire cable 12 in any suitable fashion, as for example by casting or by affixing the clamp to the cable via a compression sleeve in the manner disclosed in copending patent application Ser. No. 359,990, filed April 15, 1964, now U.S. Patent 3,205,472.

It should be understood that while a battery terminal clamp has been referred to, one could just as well apply a grounding lug.

The splice adapted 16 is tubular and of a dimension at one end whereby it may be affixed to the wire cable 12 by swaging, or sweating or even by the use of a compression sleeve such as described in detail in the aforementioned copending application is preferably formed so that a wrench, pliers or the like may be used to hold same while compression sleeve 18 is threaded into its other open end.

Compression sleeve 18 has an outer surface with a tapered thread at one end and with longitudinal slots 22 cut transversely to said threads. The opposite end 24 is polygonally shaped on the outside whereby ordinary tools, such as a wrench or a pliers may be used to affix the compression sleeve to a cable and to secure it to the splice adapter 16.

More particularly, the replacement cable of this invention comprises a length of wire cable 12 (approximately 6 inches in length) which has a splice adapter 16 affixed to one end. Affixed to the opposite end is a battery terminal clamp 14, or if one so desires a grounding lug, or any other device as the need requires. An insulation sleeve 20, which comprises an elongated, hollow member with apertured end walls 21 and 23 is positioned on the wire cable 12, as shown in FIG. 1. It is preferably constructed of resilient material so that it can be slid over the adapter 16 after the latter has been affixed to the end of a cable. The apertures formed in the end walls 21 and 23 of the sleeve 20 preferably correspond to the diameter of the wire cable 12 so that a snug fit around the cable will be provided to effect a leak-proof seal.

The splice adapter is affixed to the cable with a compression sleeve 18. This sleeve is longitudinally slotted at 22. These slots extend over a major portion of the length of the sleeve and are formed so that they traverse the entire tapered and threaded end portion 29 and preferably also the narrow neck or annular groove 60 on the body of the sleeve. Its inner diameter is selected to fit around the strands of the wire cable 12. Its inner surface has gripping teeth 19 which preferably slant forward to bite into the strands for a more positive grasp of the strands of the wire cable and a better electrical communication therewith. These teeth lock the cable against disengagement. The inner surface also preferably has a step 17 in its inner wall removed from the cable grip teeth end to accommodate the insulation covering of the cable. It may even be eliptical to accommodate flat wire. The outer surface has a tapered threaded surface 29 at one end. The taper is so designed that upon threading the connector into the hole of the adapter 16, the compression sleeve will fasten down upon the strands of the cable to tightly grip them at a point removed from the end whereby an excellent mechanical and a good electrical connection is effected even as the compression sleeve is being tightened into the adapter. The taper provides a bowed grip upon the strands which resist any "pull-out" of the cable from the compression sleeve 18.

The other end of the compression sleeve has a polygonal structure such as a square or hexagonal shape whereby ordinary tools customarily found in garages, service stations and the like may be used to assemble and affix the replacement connector onto the remainder of the battery cable.

In affixing the replacement connector upon the cable 26 (FIG. 1) one need merely snip off the old connector, strip back the insulation 27, on the remainder, a sufficient length, and then slip the compression sleeve over the exposed strands. The sleeve is then threaded into the splice adapter 16.

As the compression sleeve 18 threads into the splice adapter 16, the taper of its threaded end 29 causes the compression sleeve to tightly clamp upon the wire strands of cable 26 at a point removed from the end of the strands (see FIG. 5). Any attempt or tendency of the cable to slip out of the compression sleeve is thereafter completely resisted since the strands would have to swage themselves into a thinner diameter to pass through the restricted throat of the tightened compression sleeve. Also, teeth 19 clamped slightly into the strands but do not cut into them to deleteriously affect the continuity of each strand. A substantially integral mechanical and electrical bond is thereby effected. Furthermore, the existence of step 17 of the threaded sleeve 18 to receive the end of insulation 27, effects a complete enshrouding of the wire strands to thereafter protect them from corrosive atmospheres.

After the compression sleeve 18 is threaded into the adapter 16, the splice joint between the wire cables 12 and 26 appears as shown in FIG. 2. At this time, sleeve 20 is slid over the splice adapter 16 and the exposed portion of the compression sleeve 18 to completely cover the splice joint, as shown in FIG. 3. As sleeve 20 is slid over adapter 16 and the compression sleeve 18, its end wall 21 folds under, as shown in FIG. 4. When sleeve 20 is forced a short distance beyond the compression sleeve 18, the end wall 21 will snap about the wire cable 26, to provide a tight seal about it. The sleeve 20 is advantageously formed of polyethylene or similar resilient material so that it can be forced over the adapter 16. It is non-conductive so that the splice joint will be completely insulated. If desired one could merely wrap insulation tape around the splice adapter after installed but it is not as neat looking.

From the above description, it is apparent that a replacement connector which can be neat in appearance is provided. Furthermore, it can be seen that the replacement connector can be assembled onto the end of a battery cable or the like which has been cut-back to remove its damaged portion in a simple, expedient manner, with ordinary tools such as a wrench or pliers. It is also apparent that any electrical hazard which would exist due to the conductive nature of the adapter 16 and the compression sleeve 18 is completely eliminated, by the provision of a sleeve 20. The sleeve 20 also acts to protect the adapter and compression sleeve against corrosion so that little, if any, maintenance is required, once assembled.

As indicated above, the replacement connector 10 can be provided with various types of adapters on its one end, such as the battery terminal lug 14 shown, or a grounding lug, or the end of the cable 12 could be provided with a threaded adapter for attachment directly to an automobile frame. It is also contemplated that the splice adapter 16 can be modified to receive a compression sleeve in both of its ends, in which case the end of the wire cable 12 would be affixed to the splice adapter 16 in the same manner in which cable 26 is affixed.

In FIG. 7 there is shown a two-piece sleeve 50 having a female portion 52 and a male portion 51 with a reduced diameter section 53 which is adapted to fit snugly within the female portion 52, to retain the sleeve 50 in assembled fashion. The sleeve 50 has apertured end walls (not shown) adapted to form a tight seal about the wire cable 12, like the end walls 21 and 23 of the sleeve 20. Also, a shoulder 55 is formed on the male portion 51 so that a flush joint is provided, when assembled.

With such a two-piece structure, it is possible to separate the elements, apply them to the two different cables 12 and 26 prior to splice, then splice and then merely mate the two elements to form the insulation covering.

A pressure sensitive tape 62 may then be applied over the joint to seal it.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention, which, as a matter of language, might be said to fall therebetween.

Now that the invention has been described, what is claimed as new and desired to be secured by Letters Patent is:

1. A replacement connector comprising, in combination: a short length of replacement battery cable, a battery terminal fixedly secured to one end of said replacement battery cable and a splice adapter fixedly secured to the other end thereof, a compression sleeve having an inner diameter slightly larger than the diameter of a battery cable to which said replacement connector is to be affixed, a threaded outer surface at one end tapering toward said end, said end being slotted longitudinally, an outer polygonal surface on the opposite end and a circumferential groove between said threaded surface and said polygonal surface, said splice adapter being capable of receiving and fixedly retaining said compression sleeve therein, and forcing said compression sleeve into engagement with said battery cable to effect a splice therewith, and a resilient, electrically non-conductive sleeve normally disposed along the length of said replacement battery cable, said sleeve having end walls which surround said cable so as to provide a seal therebetween and being adapted to be slid over said adapter and said compression sleeve when assembled to completely cover and seal them therein.

References Cited

UNITED STATES PATENTS

| | | | |
|---|---|---|---|
| 2,274,437 | 2/1942 | St. George | 339—232 XR |
| 2,712,122 | 6/1955 | Kolstad | 339—47 |
| 2,760,178 | 8/1956 | Schaefer | 339—227 XR |
| 3,205,472 | 9/1965 | Shannon | 339—232 |

FOREIGN PATENTS 130,767  11/1946  Australia.

MARVIN A. CHAMPION, *Primary Examiner.*
PATRICK A. CLIFFORD, *Assistant Examiner.*